(12) United States Patent
Reedy et al.

(10) Patent No.: US 9,701,843 B2
(45) Date of Patent: Jul. 11, 2017

(54) COLORIZED MICRON SIZED FREE FLOWING FILLERS

(71) Applicant: REEDY INTERNATIONAL CORPORATION, Keyport, NJ (US)

(72) Inventors: Michael E. Reedy, Keyport, NJ (US); Bryan A. Burgess, Charlotte, NC (US)

(73) Assignee: Reedy International Corporation, Keyport, NJ (US)

( * ) Notice: Subject to any disclaimer, the term of this patent is extended or adjusted under 35 U.S.C. 154(b) by 0 days.

(21) Appl. No.: 14/278,148

(22) Filed: May 15, 2014

(65) Prior Publication Data
US 2014/0343208 A1 Nov. 20, 2014

Related U.S. Application Data

(60) Provisional application No. 61/823,489, filed on May 15, 2013.

(51) Int. Cl.
| | | |
|---|---|---|
| C09C 1/40 | (2006.01) | |
| C09C 1/02 | (2006.01) | |
| C08K 9/08 | (2006.01) | |
| C08K 3/26 | (2006.01) | |

(52) U.S. Cl.
CPC ............... C09C 1/405 (2013.01); C08K 9/08 (2013.01); C09C 1/021 (2013.01); C08K 2003/265 (2013.01)

(58) Field of Classification Search
CPC ........................................................ C08K 3/26
USPC ........................................................ 524/427
See application file for complete search history.

(56) References Cited

U.S. PATENT DOCUMENTS

| | | | |
|---|---|---|---|
| 3,950,180 A | 4/1976 | Kato | |
| 4,084,983 A | 4/1978 | Bernhard et al. | |
| 4,444,592 A | 4/1984 | Ludwig | |
| 4,543,128 A | 9/1985 | Troesch et al. | |
| 4,609,404 A | 9/1986 | Marraccini et al. | |
| 4,655,843 A | 4/1987 | Marraccini et al. | |
| 4,672,701 A | 6/1987 | Kocsis | |
| 4,753,679 A * | 6/1988 | Damiano et al. | 106/664 |
| 4,773,936 A | 9/1988 | Clark et al. | |
| 5,106,420 A | 4/1992 | Marshall, Jr. | |
| 5,120,521 A * | 6/1992 | Ebinuma | C01F 11/182 106/465 |
| 5,458,680 A | 10/1995 | Shurling, Jr. et al. | |
| 5,596,027 A | 1/1997 | Mead et al. | |
| 5,650,003 A | 7/1997 | Curtis et al. | |
| 5,653,794 A | 8/1997 | Weber et al. | |
| 5,879,804 A * | 3/1999 | Tsubuku | 428/402 |
| 6,048,914 A * | 4/2000 | Goto et al. | 523/161 |
| 6,379,452 B1 | 4/2002 | Maxwell et al. | |
| 6,436,538 B1 | 8/2002 | Takahashi et al. | |
| 6,706,330 B2 | 3/2004 | Takahashi et al. | |
| 7,666,505 B2 | 2/2010 | Datta et al. | |
| 7,988,074 B2 | 8/2011 | Mirko | |
| 8,329,289 B2 | 12/2012 | Buri et al. | |
| 2005/0143495 A1* | 6/2005 | Padareva | C08K 5/34 523/216 |
| 2007/0033747 A1* | 2/2007 | Chianelli et al. | 8/498 |
| 2009/0162638 A1* | 6/2009 | Buri | B82Y 30/00 428/323 |
| 2009/0301351 A1 | 12/2009 | Buri et al. | |
| 2009/0318614 A1* | 12/2009 | Chevalier | 524/588 |
| 2010/0222484 A1* | 9/2010 | Buri | C01F 11/185 524/425 |

FOREIGN PATENT DOCUMENTS

| | | |
|---|---|---|
| EP | 2329712 A1 | 12/2009 |
| WO | 03/051978 A1 | 6/2003 |
| WO | 2005/121257 A2 | 12/2005 |
| WO | 2011/077232 A1 | 6/2011 |

OTHER PUBLICATIONS

Johannes Lorenz, Karl Audenaerade "High-Frequency Coaxial Cable—An Explanation of Microcellular Foaming Technology in Extrusion" Blowing Agents and Foaming Processes 2005 Stuttgart, Germany May 2005 (8 Pages).
W. M. Meier, D. H. Olson, and Ch. Baerlocher, "Atlas of Zeolite Structure Types", Elsevier Press (1996) 4th ed.
Mohd Asyraf Reduan Azmi "The Effect of Calcium Carbonate and Calcined Clay Micro Filler Materials on the Electrical Characteristics of Polyvinyl Chloride for Cable Insulation" Universiti Teknologi Malaysia May 2008 (92 Pages).
Chris Surbrook, "Study of Sekur Treatment of Omya Calcium Carbonates" 2012 (3 Pages).
International Search Report dated Sep. 23, 2014 from PCT Application No. PCT/US2014/038078, 3 pages.
Written Opinion dated Sep. 23, 2014 from PCT Application No. PCT/US2014/038078, 11 pages.
International Preliminary Report on Patentability dated May 14, 2015 from corresponding International Patent Application No. PCT/US2014/038078, 6 pages.

* cited by examiner

*Primary Examiner* — Doris Lee
(74) *Attorney, Agent, or Firm* — Ohlandt, Greeley, Ruggiero & Perle, L.L.P.

(57) ABSTRACT

Disclosed are compositions of fillers coated with adhesion promoting material alone, or also coated with an additive, processes for producing the coated fillers, the fillers obtained from those processes, and methods of using the coated fillers. The filler particle(s) are surface-treated with a component which assists in the adhesion/adherance of an additive to the filler particles, resulting in the desired additive-coated fillers. The filler, adhesion promoting material and additive can be mixed in slurry and dried, and the resulting filler particles are directly useful in many applications, such as paper coatings, plastic compositions (both foamed and non-foamed), inks, paints, cosmetics, textiles and the like, wherever such fillers now find application. Preferably, the additive is a colorant.

10 Claims, No Drawings

COLORIZED MICRON SIZED FREE FLOWING FILLERS

CROSS-REFERENCED APPLICATION

This application is a continuation of and claims priority to U.S. Provisional Patent Application Ser. No. 61/823,489, filed May 15, 2013, the contents of which is incorporated by reference herein in its entirety.

BACKGROUND

1. Field of the Disclosure

The present disclosure relates to compositions comprised of free flowing micron sized colorized fillers, processes for producing the fillers, fillers obtained from those processes, and methods of using the fillers.

2. Background of the Disclosure

U.S. Pat. No. 3,950,180 relates to so-called inexpensive coloring composites comprising inorganic substances as main component combined with organic basic colored compounds.

U.S. Pat. No. 4,084,983 relates to colored lustrous pigments having special color effects. This object is said to be attained by binding the dyestuff primarily chemically on the surface of the pigment particles.

U.S. Pat. No. 4,444,592 relates to blue-hued pigments which are the reaction product of water-insoluble aryl para-rosaniline compounds and heteropoly acids (illustratively phosphomolybdic acid or phosphotungstic acid) and the process of their manufacture.

U.S. Pat. No. 4,543,128 relates to colored composition comprising an aqueous paste or dispersion of a filler which has been dyed with a water-soluble polycationic dyestuff.

U.S. Pat. No. 4,609,404 relates to organic dyes containing a silane group which are insoluble in water and suitable to provide composite pigments by grafting onto the surface of an inorganic substrate.

U.S. Pat. No. 4,655,843 relates to diimidic tetracarboxylic perylene dyes having chemically combined therewith at least one silane group, and to the corresponding silane composite pigments, prepared by association thereof with an inorganic solid substrate.

U.S. Pat. No. 4,773,936 relates to water-insoluble pigment comprising a complex of a water-insoluble inorganic substrate exhibiting anion exchange properties, a water-soluble dye, and an anionic amphipathic material is disclosed.

U.S. Pat. No. 5,106,420 relates to water-soluble organic dyes which have been insolubilized or "fixed" onto various mineral pigment substrates to thereby form mineral-based coloring pigments.

U.S. Pat. No. 5,458,680 relates to the preparation of chemically aggregated composite pigments, using organo-silicon compounds. The products are said to be useful as fillers and in coatings for paper.

U.S. Pat. No. 5,650,003 relates to a composition containing $TiO_2$ and calcined clay in a weight ratio of between about 30:70 and 70:30, that is substantially free of a functional microgel component.

U.S. Pat. No. 5,653,794 relates to a process for the production of hydrophobic inorganic oxide products which comprises reacting the inorganic oxide particles with organohalosilanes, preferably organochlorosilanes, to produce hydrophobic organosilane coated inorganic oxides.

U.S. Pat. No. 6,379,452 relates to calcined kaolin clay pigments said to have improved color manufactured by adding a blue agent to the kaolin clay pigment prior to calcination, and then calcining the pigment and blue agent mixture.

U.S. Pat. Nos. 6,436,538 and 6,706,330 relate to a collection of composite platelet-like particles comprising a core and at least one coating layer consisting essentially of a compound having from 60 to 95% by weight of carbon and from 5 to 25% by weight of nitrogen, the balance to 100% being selected from elements of the group consisting of hydrogen, oxygen and sulfur.

SUMMARY OF THE DISCLOSURE

In one embodiment, the present disclosure relates to processes for preparing filler compositions comprising one or more fillers having a substantially uniform coating of a material which promotes adhesion/adherence of desired additives to a plurality of the coated filler(s), the coated filler compositions obtained by such processes, the use of the coated filler(s) in applications which call for such a filler to be included, and the processes for obtaining the resulting products from the use of such coated filler(s) in the mentioned applications. The filler particle(s) have been surface-treated with a component, the component assisting in the adhesion/adherance of an additive to the filler particles, resulting in the filler-containing additives which are an object of this disclosure. The filler, additive, and component can be mixed in aqueous slurry, dried and the resulting filler particles are directly useful in many applications, such as paper coatings, plastic compositions (both foamed and non-foamed), inks, paints, cosmetics, textiles and the like, wherever such fillers now find application. The additive can be tailored to accommodate the particular needs of the particular use contemplated.

Fillers which find application in the present disclosure include any filler or particulate material which is desired to be used in any particular application by the end user. The only requirement of the filler itself is that it be insoluble, or substantially insoluble, in the medium in which it is slurried. The filler can be in any shape or form, i.e., fibrillar, sphere-like, tubular, etc. Preferably used as fillers are calcium carbonate particles, zeolite particles, halloysites, PTFE particles, perlite, stabilizers, pumice, pumice perlite, white rock, talc, wood fiber, expanded perlite, and sodium potassium aluminum silicate, to name a few classes of such fillers. Most preferable are calcium carbonate particles, zeolite particles, PTFE particles and halloysites. These fillers and others are widely known. The filler(s) preferably are micron sized.

The fillers are coated with a material which promotes adhesion of a desired additive to the filler. Preferably, the adhesion-promoting material is comprised of one or more thermoplastic neutralized ethylene-acrylic acid copolymers. As used herein, the phrase "substantially uniform" means that at least about 50%, preferably at least about 60%, more preferably at least about 75%, most preferably at least about 85-90% and especially preferably at least about 90-95% or more of the surface area of the particle(s) sought to be coated with the material and/or additive are so-coated. Also, a "plurality of" as used herein means at least about 50%, preferably at least about 60%, more preferably at least about 75%, most preferably at least about 85-90% and especially preferably at least about 90-95% or more of the fillers and/or other target of the coating of material or additive are substantially uniformly coated, as mentioned above.

In another embodiment, the present disclosure relates to further treating the resulting substantially uniformly coated filler compositions as described above with an additive which imparts to the filler desired additive properties for use in further processes and applications. The additive which can be added to the substantially uniformly coated filler compositions may be selected from colorants, fire retardants, nucleating agents useful in producing foamed polymeric compositions, antioxidizing agents, and other such related additives.

Also, though in general terms coated fillers may be known in the art, it has heretofore been difficult to obtain such fillers which are micron sized yet free flowing powders, especially when coated. Agglomeration is one of the problems faced when coating such fillers, and such agglomeration precludes the resulting fillers from being free flowing. The free flowing characteristic of the disclosed fillers in micron sizes is obtained by the use of a specific drying method which allows for the production of such fillers.

In one embodiment, the present disclosure provides processes for producing substantially uniformly coated filler compositions comprised of the following steps:

(a) preparing a mixture or slurry of filler in a medium to form a slurried suspension or mixture of filler;

(b) adding to the slurried suspension or mixture obtained in step (a) a material which promotes adhesion/adherence of desired additive(s) to the filler to form coated filler slurried suspension or mixture having a substantially uniform coating of said adhesion/adherence promoting material to a plurality of filler to obtain a coated filler;

(c) adding to the coated filler obtained in step (b) an additive which imparts to the filler desired additive properties to form a slurried suspension or mixture of additive-containing filler; and (d) drying the additive-containing filler to obtain particles comprised of filler, adhesion-promoting material and additive. Preferably, the particles are free-flowing and a plurality of the particles are substantially uniformly coated particles, substantially uniformly coated with the additive.

The above steps (a), (b), and (c) can be performed sequentially or concurrently; that is, the filler may be collected and packaged and then later slurried to form the suspension as set forth in step (a), then collected and later coated with the material as set forth in step (b) and again collected and later treated with the desired additive as set forth in step (c).

Alternatively, the process may be carried out by performing any combination of steps and then the resulting filler product collected. Still further, alternatively, all of steps (a), (b), and (c) may be performed sequentially one after the other. Specifically, the filler may be suspended, the adhesion/adherence promoting material may be added to that suspension to form the substantially uniformly coated filler, and the additive may be added to that substantially uniformly coated filler, all in the same vessel, performed sequentially.

A further aspect of the present disclosure are the filler compositions resulting from the processes set forth above. In one embodiment of such aspect, the substantially uniformly coated filler, having a coating of adherence/adhesion promoting material, resulting from step (b) above, may be collected and saved for later use. Still further, the filler resulting from step (c) in the above processes may be collected and saved for later use.

Still further, the present disclosure contemplates the use of the obtained filler compositions as additives in further processes for processing or treating substrates to obtain products having desired properties imparted or enhanced by the filler compositions of the present disclosure. For example, the filler compositions of the present disclosure may be used in further processes to impart or enhance desired properties such as color, fire retardance, anti-drip properties, nucleation site creation, and/or lubrication to such products as paper coatings, plastic compositions (both foamed and non-foamed), inks, paints, cosmetics, textiles, building materials and the like, wherever appropriate filler(s) now find application.

DETAILED DESCRIPTION OF THE DISCLOSURE

The disclosure will now be described in respect of the preferred fillers, the preferred adherence/adhesion promoting material, and the preferred additive. The preferred fillers include calcium carbonate, halloysites, PTFE particles and zeolite; the preferred adherence/adhesion promoting material includes neutralized ethylene-acrylic acid (EAA) copolymers; and the preferred additive is one or more colorant(s).

Preferred Fillers

Calcium carbonate is a chemical substance, represented by the chemical formula $CaCO_3$. It is estimated that about 4 percent of the Earth's crust is made up of calcium carbonate. The calcium carbonate cycle is composed of rocks, minerals, water, plants and animals. It is found naturally as minerals and rocks, some of which include calcite, limestone, chalk, marble and aragonite. Minerals and rocks impart calcium carbonate in natural water sources, resulting in hard water. In fact, calcium carbonate is the main cause of water hardness. It is also a major constituent compound of the shells and skeletons of animals. Calcium carbonate is used in many aspects of life, either in naturally occurring state or pure form. Pure calcium carbonate is extracted from natural sources by means of various techniques like mining and quarrying. The constituent elements and chemical properties of calcium carbonate make it a favorable substance for use in therapeutic purposes and many other industries. The main use of calcium carbonate is in the construction industry, either as a building material or limestone aggregate for road building or as an ingredient of cement or as the starting material for the preparation of builder's lime by burning in a kiln. However, due to weathering, mainly caused by acid rain, calcium carbonate (in limestone form) is no longer used for building purposes on its own, and only as a raw/primary substance for building materials.

Calcium carbonate is also used in the purification of iron from iron ore in a blast furnace. Calcium carbonate is calcined in situ to give calcium oxide, which forms a slag with various impurities present, and separates from the purified iron. Calcium carbonate is also used in the oil industry in drilling fluid as a formation bridging and filter cake sealing agent and may also be used as a weighting material to increase the density of drilling fluids to control down-hole pressures. Precipitated calcium carbonate, pre-dispersed in slurry form, is also now widely used as filler material for latex gloves with the aim of achieving maximum saving in material and production costs. Calcium carbonate is widely used as an extender in paints, in particular matte emulsion paints where typically 30% by weight of the paint is either chalk or marble. Calcium carbonate is also widely used as a filler in plastics. Some typical examples include around 15 to 20% loading of chalk in unplasticized polyvinyl chloride drain pipe, 5 to 15% loading of stearate coated chalk or marble in unplasticized polyvinyl chloride window profile. PVC cables can use calcium carbonate at loadings of up to 70 parts per hundred parts of resin to improve mechanical properties (tensile strength and elongation) and electrical properties (volume resistivity). Polypropylene compounds are often filled with calcium carbonate to increase rigidity, a requirement that becomes important at high use temperatures. $CaCO_3$ is also routinely used as filler in thermosetting resins and has also been mixed with ABS, and other ingredients, to form some types of compression molded "clay" Poker chips. Fine ground calcium carbonate is an essential ingredient in the microporous film used in babies' diapers and some building films as the pores are nucleated around the calcium carbonate particles during the manufacture of the film by biaxial stretching.

Calcium carbonate is also used in a wide range of trade and do-it-yourself adhesives, sealants, and decorating fillers. Ceramic tile adhesives typically contain 70 to 80% limestone. Decorating crack fillers contain similar levels of marble or dolomite. Calcium carbonate is also mixed with putty in setting windows, and as a resist to prevent glass from sticking to kiln shelves when firing glazes and paints at high temperature. Calcium carbonate is known as whiting in ceramics/glazing applications, where it is used as a common ingredient for many glazes in its white powdered form. When a glaze containing calcium carbonate is fired in a kiln, the whiting acts as a flux material in the glaze.

Ground Calcium Carbonate (GCC) or Precipitated Calcium Carbonate (PCC) is used as filler in paper. GCC and PCC are cheaper than wood fiber, so adding these to paper is cost efficient for the paper industry. Printing and writing paper can be made of 10-20% calcium carbonate. In North America, calcium carbonate has begun to replace kaolin in the production of glossy paper. Europe has been practicing this as alkaline papermaking, or acid-free papermaking, for some decades. Calcium carbonates are available in various forms: ground calcium carbonate (GCC) or precipitated calcium carbonate (PCC). The latter has a very fine and controlled particle size, on the order of 2 micrometers in diameter, useful in coatings for paper. It is commonly called chalk as it has traditionally been a major component of blackboard chalk. Modern manufactured chalk is now mostly gypsum, hydrated calcium sulfate $CaSO_4.2H_2O$. Ground calcium carbonate is further used as an abrasive (both as scouring powder and as an ingredient of household scouring creams), in particular in its calcite form, which has the substantially low hardness level of 3 on the Mohs scale of mineral hardness, and will therefore not scratch glass and most other ceramics, enamel, bronze, iron, and steel, and have a moderate effect on softer metals like aluminum and copper.

In the paper industry in the last three decades, GCC produced from marble, and to a lesser extent limestone and chalk, has earned the acceptance of important segments of global paper production. GCC is now the primary filler and coating pigment used in free sheet coated and uncoated papers. Its advantages are also being recognized in the success of its growing use in ground wood HWC, MWC and LWC coated papers. The use of $CaCO_3$-containing post-consumer wastes in the fiber mix for making ground wood SC papers favors natural GCC as the primary filler along with kaolin and talc. GCC has proven to be an important technological and economic advantage in papermaking in all the world's major producing areas, including Europe, North and South America, Australia, Asia and Africa. Building on the primary attributes of brightness and rheology, GCC continues to grow as a major pigment in value-added coating applications around the world. Printability and improved economics also add to its popularity. Ultra-fine GCC products are being used in grades from LWC to board; at levels of up to 100% in pre-coats; and at levels of up to 80% in free sheet topcoats. GCC products now represent more than 55% of the total coating pigment usage in Europe, and similar potential is apparent in North America. Depending upon the application, in the paper industry the median particle size of $CaCO_3$ used ranges from 0.4 to 3.2 microns, preferably from 0.4 to 1.4 microns, with the particle size percent less than 2 microns ranging from as little as 35% to as high as 98%, preferably ranging from 60% to 98%, and most often from 90% to 98%.

In the paint and coating industries, calcium carbonate has established itself as a primary extender for paints. Important properties are its non-toxicity, low intrinsic color, weather resistance, low abrasiveness, low electrolyte content and pH stabilizing effect. The binder demand is low due to its particle shape and packing fraction. Fineness and particle size distribution determine the opacity. Hydrophobic calcites improve the anti-corrosion and rheological properties of coatings. The diameter of the primary particles is close to the size required to achieve maximum scattering of light, permitting the partial replacement of expensive white pigments. Further developments are coating systems with carefully designed packing which introduces capillaries, shortening drying times. This is particularly important for water-based systems. In these applications, the particle size of the $CaCO_3$ ranges from about 0.7 to about 24 microns depending upon the degree of opacity and whiteness desired, and the whiteness ranges from about 85% to about 98%. The role of ground calcium carbonate in adhesives, caulks and sealants is to reduce cost and improve physical properties. These fine ground powders have tightly controlled particle distribution to allow for high loading levels and reduced resin demand. Special care is given to control large particles to provide smooth finishes. The role of ground calcium carbonate in joint compounds is to serve as a functional mineral of high brightness with low binder demand to accomplish excellent shrinkage control. Additionally, careful attention is paid to controlling the top size to prevent problems associated with over size particles (grit).

The addition of fine ground calcium carbonate in PVC formulations provides great economic benefits by extending the polymer, enhancing many physical properties and improving the processability characteristics of the compound. In almost every opaque application, calcium carbonate filled PVC has proven to be a cost effective addition. Improved products can be manufactured and have successfully replaced more costly ones. Calcium carbonate helps prevent the buildup of material in complicated tools improving the surface finish of the final product. Flexible PVC compounds can be customized relative to hardness, tensile properties, flexural properties and surface gloss by selecting the appropriate loading, and particle size of the carbonate. In sheet molding compound, unsaturated polyester filled with 40% fine ground calcium carbonate is widely used in the appliance and automotive industries. The role of calcium carbonate is to control viscosity, control the coefficient of thermal expansion, add strength to the polymer, and lower the cost of the finished product. The addition of calcium carbonate with closely controlled properties allows the producer to make a product that successfully rivals steel and aluminum. Consistency in the particle size and particle size distribution of calcium carbonate is essential to give controllable viscosity. Fine particle size is needed to get class 'A' surfaces on molded parts.

Calcium carbonate has demonstrated performance in a variety of polyolefin markets including diaper film, furniture, construction materials, automotive products, trash and garbage bags, pipe, large garbage cans, food containers, synthetic paper and bottles to name a few. Performance benefits such as significantly increased output (linear rate or cycles) and improvement of many physical properties are achievable. Increased output is obtained since calcium carbonate has thermal conductivity over five (5) times greater than PE or PP. Use of 15% and 30% by weight of fine calcium carbonate (1.5 microns) is optimum depending on the product being manufactured and the resin being employed. The role of ground calcium carbonate in vinyl flooring is to serve as a mineral with high whiteness and low PVC resin demand.

Zeolites are materials, sometimes referred to as molecular sieves, with discreet channels and cages that allow the diffusion of molecules into and out of their crystalline structures. The utility of these materials lies in their microstructures that allow access to large internal surface areas and that increase adsorptive and ion exchange capacity.

Solids, liquids or gases (preferably liquids and gases) are trapped by zeolites via strong physical and/or chemical forces, such as ionic forces, covalent forces and electrostatic attractions. These trapped solids, liquids, or gases can be released by the application of heat, change in pressure or by displacement with another material, leaving the crystal structure of the molecular sieve in the same physio-chemical state as when the trapped solid, liquid or gas entered. The trapping and release are generally substantially completely reversible with the respective isotherm curves coinciding completely, or nearly so. Isotherm curves can be used to determine the manner in which to regulate the trapping and release of the adsorbed material(s).

Zeolites possess a very high surface area; for example, the external surface area of zeolites only comprises approximately one percent (1%) of the total surface area. Zeolites have been proposed for use in plastic and wood-plastic composites, and zeolites have also been proposed as carriers for foaming agents in the production of plastic (thermoset and thermoplastic) foams and in wood-plastic composite foams. The entire surface area of the zeolite is capable of and available for trapping the foaming agent(s). Therefore, the external surface area of the zeolites is available for adsorbed material(s) of all sizes, whereas the internal surface area is available only to molecules small enough to enter the pores. However, because the external surface comprises approximately one percent (1%) of the total surface area, materials too large to be trapped within the pores will usually only be held by the external surface to the extent of 0.2 to 1 weight percent.

The zeolite framework is made up of $SiO_2$ tetrahedra linked by shared oxygen atoms. Substitution of aluminum for silicon creates a charge imbalance that requires a non-framework cation to balance the charge. These cations, which are contained inside the channels and cages of these materials, may be replaced by other cations giving rise to ion exchange properties. The zeolites also contain water of hydration as part of their structure. The water of hydration in these materials may typically be reversibly removed leaving the host structure intact, although some framework distortion may occur. In addition, zeolite materials are typically alkaline. Suspensions of low $SiO_2:Al2O_3$ ratio materials in water often give rise to a pH greater than 9. This combination of alkalinity and the pore structure of these compounds is believed to be largely responsible for the ability of these zeolites to stabilize halogenated polymers by neutralizing acids released during processing and creating inert salts and/or scavenging excess cationic metals.

Zeolites are frequently categorized by their crystalline unit cell structure (See W. M. Meier, D. H. Olson, and Ch. Baerlocher, Atlas of Zeolite Structure Types, Elsevier Press (1996) 4th ed.). Those suitable for use in the present disclosure include compounds characterized as zeolite A, zeolite P, zeolite X, and zeolite Y. In the present disclosure, any suitable zeolite can be used as is for those application where foaming agents will not be employed, or the zeolites may be used to trap the desired foaming agent for foaming applications. For foaming applications, the appropriate zeolite is dependent on the size, electronegativity and polarizability of the adsorbed material(s) desired to be trapped. Appropriate zeolites for the present disclosure include, but are not limited to, Type 3A, 4A, 5A, 13X and combinations thereof (the A represents angstroms, and 13X has a pore size greater than 5A).

A wide variety of zeolites are available, each with its own specific and uniform pore size. This variety allows for the zeolite to be chosen on the basis of the material to be trapped. Generalized pore size and adsorbtion characteristics of type 3A, 4A, 5A and 13X molecular sieves are as follows: Type 3A may be used to trap molecules with an effective diameter of less than 3 angstroms, including, for example, water and ammonia, and excludes molecules with a diameter of more than 3 angstroms, such as ethane. Type 4A may be used to trap molecules with an effective diameter of less than 4 angstroms, including, for example, ethanol, hydrogen sulfide, carbon dioxide, sulfur dioxide, ethylene, ethane, and propene, and excludes molecules with an effective diameter greater than 4 angstroms, such as propene. Type 5A may be used to trap molecules having an effective diameter of less than 5 angstroms, including, for example, n-butanol, n-butane, saturated hydrocarbons from methane to molecules containing twenty-two carbons, R-12, and excludes molecules having an effective diameter of greater than 5 angstroms, including iso-compounds and four carbon ring compounds. 13X may be used to trap molecules having an effective diameter less than 10 angstroms, and excludes molecules having an effective diameter greater than 10 angstroms. Each type molecular sieve may trap molecules of the lower type, i.e., Type 5A may adsorb molecules adsorbed by Type 4A, and so forth. However, trapping of the foaming agent(s) may be more efficient using a zeolite with pore size more closely analogous to the size of the molecule being trapped, especially in effective retention of the trapped adsorbed material(s) prior to and during processing.

The zeolites useful in the present disclosure may be generally designated by the chemical formula $M_2/nO.Al_2O_3.ySiO_2.wH_2O$ in which M is a charge balancing, exchangeable cation, n is the valence of M and is 1 or 2, y is the number of moles of $SiO_2$ and is about 1.8 to about 15, and w is the number of moles of water of hydration per molecule of the zeolite. Suitable charge balancing cations represented by M in the formula include such cations as sodium, potassium, zinc, magnesium, calcium, ammonium, tetra-alkyl and/or—aryl ammonium, lithium, Ag, Cd, Ba, Cu, Co, Sr, Ni, Fe, and mixtures thereof. The preferred cations are alkali metal and/or alkaline earth metal cations, with the proviso that, when M is a mixture of alkali or alkaline earth metals comprising sodium and potassium and/or calcium, the preferred potassium and/or calcium content is less than about 35% by weight of the total alkali or alkaline earth metal content.

The size and position of the exchangeable cation (Na, Ca, etc.) may affect the pore size in any particular type of zeolite. For example, the replacement of sodium ions in Type 4A with calcium ions produces Type 5A, with a free aperture size of 4.2 angstroms. Not wishing to be bound by any theory, the cations are also probably responsible for the very strong and selective electronic forces which are unique to these adsorbents. In the case of zeolites, selectivity is influenced by the electronic effects of the cations in the cavity as well as the size of the apertures in the aluminosilica framework. Therefore, zeolites can be tailored to "trap" specific molecules by varying the size of the pores and the attractive forces.

As mentioned, zeolites will not only separate molecules based on size and configuration, but they will also trap preferentially based on polarity or degree of chemical unsaturation. Therefore, molecules are held more tightly in the crystal structure if they are less volatile, more polar, or less chemically saturated. Some of the strongest trapping forces are due to cations acting as sites of strong, localized, positive charge that electrostatically attract the negative end of polar molecules. Polar molecules are molecules containing heteroatoms such as O, S, Cl, F, or N and are usually asymmetrical. Dipole moments can also be induced by cations present in the zeolites, resulting in the attraction of sites of unsaturation over saturated bonds. In view of these means of attraction, the ability of zeolites to trap and hold the foaming agent is based not only on molecular size, but additionally on the basis of electronic forces. For example, zeolites will trap water in preference to argon and olefins in preference to saturated hydrocarbons.

While the number of moles of $SiO_2$ per molecule of aluminosilicate, represented in the formula by "y", may be in the range of about 1.8 or greater, it is suitably about 1.85 to about 15, more suitably about 1.85 to about 10, preferably in the range of about 2 to about 5, and more preferably in the range of about 1.8 to about 3.5. The number of moles of water in the zeolite as water of hydration, represented in the formula by "w", is generally greater than about 0.1, more generally in the range of about 0.1 to about 10.

It is desirable that the zeolite have a mean particle size in the range of about 0.1 to about 10 microns, suitably wherein at least about 90% of the particles are less than about 50 microns, advantageously less than about 25 microns, and more advantageously less than about 10 microns. It is also desirable that the zeolite have a mean micropore diameter in the range of about 2.8 to about 8A, and/or an external surface area in the range of about 3 to about 300 square meters/g.

In the present disclosure, the most preferred zeolites are the ADVERA 401 PS, ADVERA 401 P and ADVERA 401 F sodium aluminosilicate hydrated type Na-A zeolite powders, all available from PQ Corporation. Each of the ADVERA zeolites has: an average nominal chemical composition of 17% Na2O, 28% Al2O3, 33% SiO2, and 22% H2O; a nominal pore size diameter of 4A; and a moisture loss at 800 degrees C. of 18%-22% by weight. These zeolites vary somewhat in average particle size and particle size distribution.

Halloysite, a naturally occurring aluminosilicate nanotube, is a two-layered aluminosilicate, with a predominantly hollow tubular structure in the submicron range and chemically similar to kaolin. Halloysite typically forms by hydrothermal alteration of alumino-silicate minerals. It can occur intermixed with dickite, kaolinite, montmorillonite and other clay minerals. X-ray diffraction studies are required for positive identification. The formation of halloysite is due to hydrothermal alteration, and it is often found near carbonate rocks. For example, halloysite samples found in Colorado are suspected to be the weathering product of rhyolite by downward moving waters. In general, the formation of clay minerals is highly favored in tropical and sub-tropical climates due to the immense amounts of water flow. Halloysite has also been found overlaying basaltic rock, showing no gradual changes from rock to mineral formation. Halloysite occurs primarily in recently-exposed volcanic-derived soils, but it also forms from primary minerals in tropical soils or pre-glacially weathered materials. Igneous rocks, especially glassy basaltic rocks are more susceptible to weathering and alteration forming halloysite.

Halloysite is often found in close association with goethite and limonite and often interspersed with alunite. Feldspars are also subject to decomposition by water saturated with carbon dioxide. When feldspar occurs near the surface of lava flows, the $CO_2$ concentration is high, and reaction rates are rapid. With increasing depth, the leaching solutions become saturated with silica, aluminium, sodium, and calcium. Once the solutions are depleted of $CO_2$ they precipitate as secondary minerals. The decomposition is dependent on the flow of water. In the case that halloysite is formed from plagioclase it will not pass through intermediate stages.

Halloysite is a 1:1 aluminosilicate clay mineral with the empirical formula $Al_2Si_2O_5(OH)_4$. It also contains water of hydration. Its main constituents are aluminium (20.90%), silicon (21.76%), and hydrogen (1.56%). The neighboring alumina and silica layers, and their waters of hydration, form curves and multilayer tubes due to a packing disorder. Halloysite is an economically viable material that can be mined from the corresponding deposit as a raw material. As for most natural materials, the size of halloysite particles varies within 1-15 microns in length and 10-150 nm in inner diameter, depending on the deposits. This material has an average tube diameter of 50 nm and inner lumen diameter of 15 nm. Typically, a nominal specific surface area of halloysite is 65 m2/g; pore volume of ~1.25 mL/g; refractive index 1.54; and specific gravity 2.53 g/cm3. Chemically, the outer surface of the halloysite nanotubes has properties similar to $SiO_2$ while the inner cylinder core is related to $Al_2O_3$. The charge (zeta potential) behavior of halloysite particles can be roughly described by superposition of mostly negative (at pH 6-7) surface potential of $SiO_2$, with a small contribution from the positive $Al_2O_3$ inner surface. The positive (below pH 8.5) charge of the inner lumen promotes loading of halloysite nanotubes with negative macromolecules, which are at the same time repelled from the negatively charged outer surfaces.

These unique tubes can be dispersed by normal extrusion processes in a variety of polymer melts to produce nanocomposites with unusual physical properties. Their addition reduces the polymer MIF, making for more easily controlled mixing and extrusion. Dispersions can be made directly to the desired working composition or a concentrate may be let down to that concentration. Injection molded parts or blown films have been produced from a variety of different polymers, including nylon, polypropylene, and several varieties of polyethylene. The halloysite nanotubes can also be dispersed into polymer latexes and dispersions in order to produce coating formulations which in turn produce coatings with advantaged physical properties. The various polymer concentrates and surface treated methodologies allow easy routes into improved polymer performance.

Both hydrophobic and hydrophilic agents can be entrapped in halloysite nanotubes after an appropriate pretreatment of the halloysite surface. Macromolecular release profiles from the halloysite are well described by a one-dimensional diffusion model through the nanotube lumen opening. A wide range of active agents, including drugs, nicotinamide adenine dinucleotide (NED), and marine biocides, can be entrapped within the inner lumen, as well as within void spaces of the multilayered aluminosilicate shells. This entrapment can be followed by retention and release of the agents, making the halloysite a nanomaterial well suited for macromolecular delivery applications. Other applications employing halloysite nanotubules may include control of loading and release of macromolecules by making stoppers or narrowing the exits from the nanotubule lumen, and development of the tubule nanoreactor concept by carrying out reactions at the openings of the halloysite nanotubules between loaded molecules and molecules in bulk solution. Possible applications of halloysite nanotubes include controlled release of anti-corrosion agents, sustained release of herbicides, insecticides, fungicides and anti-microbials, sustained release of drugs, food additives, and fragrances, templating synthesis of rod-like nanoparticles, uses as catalytic supports and molecular sieves, specific ion adsorption, use as plastic fillers for strength reinforcement and scratch protection, use in advanced ceramic materials, especially biocompatible implants.

PTFE is a thermoplastic polymer which is a white solid at room temperature, with a density of about 2.2 $g/cm^3$. According to published literature, its melting point is 327° C. (621° F.), but its mechanical properties degrade above 260° C. (500° F.). PTFE gains its properties from the aggregate effect of carbon-fluorine bonds, as do all fluorocarbons. The coefficient of friction of plastics is usually measured against polished steel. PTFE's coefficient of friction is 0.05 to 0.10, which is the third-lowest of any known solid material. PTFE's has excellent resistance to van der Waals forces as well. PTFE also has excellent dielectric properties. This is especially true at high radio frequencies, making it suitable for use as an insulator in cables and connector assemblies and as a material for printed circuit boards used at microwave frequencies. Combined with its high melting temperature, this makes it the material of choice as a high-performance substitute for the weaker and lower melting point polyethylene that is commonly used in low-cost applications.

Because of its chemical inertness, PTFE cannot be cross-linked like an elastomer. Therefore, it has no "memory" and is subject to creep. This is advantageous when used as a seal, because the material creeps a small amount to conform to the mating surface. However, to keep the seal from creeping too much, fillers are used, which can also improve wear resistance and reduce friction. Sometimes, metal springs apply continuous force to PTFE seals to give good contact, while permitting a beneficially low percentage of creep.

Owing to its low friction, PTFE is used for applications where sliding action of parts is needed: plain bearings, gears, slide plates, etc. In these applications, it performs significantly better than nylon and acetal, and is comparable to ultra-high-molecular-weight polyethylene (UHMWPE), although UHMWPE is more resistant to wear than PTFE. For these applications, versions of PTFE with mineral oil or molybdenum disulfide embedded as additional lubricants in its matrix are being manufactured. PTFE's extremely high bulk resistivity makes it an ideal material for fabricating long-life electrets, useful devices that are the electrostatic analogues of magnets. Gore-Tex is a material incorporating a fluoropolymer membrane with micropores. The roof of the Hubert H. Humphrey Metrodome in Minneapolis is one of the largest applications of Teflon PTFE coatings, using 20 acres (81,000 $m^2$) of the material in a double-layered, white dome, made with PTFE-coated fiberglass, which gives the stadium its distinctive appearance. The Millennium Dome in London is also made with a substantial use of PTFE coatings.

Powdered PTFE is used in pyrotechnic compositions as an oxidizer together with powdered metals such as aluminium and magnesium. Upon ignition, these mixtures form carbonaceous soot and the corresponding metal fluoride, and release large amounts of heat. Hence they are used as infrared decoy flares and igniters for solid-fuel rocket propellants. In optical radiometry, sheets made from PTFE are used as measuring heads in spectroradiometers and broadband radiometers (e.g., illuminance meters and UV radiometers) due to PTFE's capability to diffuse a transmitting light nearly perfectly. Moreover, optical properties of PTFE stay constant over a wide range of wavelengths, from UV up to near infrared. In this region, the relation of its regular transmittance to diffuse transmittance is negligibly small, so light transmitted through a diffuser (PTFE sheet) radiates like Lambert's cosine law. Thus, PTFE enables co-sinusoidal angular response for a detector measuring the power of optical radiation at a surface, e.g., in solar irradiance measurements. PTFE is also used to coat certain types of hardened, armor-piercing bullets, so as to prevent the increased wear on the firearm's rifling that would result from the harder projectile, however it is not the PTFE itself that gives the bullet its armor-piercing property. High corrosion resistance favors the use of PTFE in laboratory environments as containers, as magnetic stirrer coatings, and as tubing for highly corrosive chemicals such as hydrofluoric acid, which will dissolve glass containers. PTFE is also widely used as a thread seal tape in plumbing applications, largely replacing paste thread dope. PTFE membrane filters are among the most efficient used in industrial air filtration applications. Filter coated with a PTFE membrane are often used within a dust collection system to collect particulate matter from air streams in applications involving high temperatures and high particulate loads such as coal-fired power plants, cement production, and steel foundries. PTFE grafts can be used to bypass stenotic arteries in peripheral vascular disease, if a suitable autologous vein graft is not available. PTFE can be used to prevent insects climbing up surfaces painted with the material. PTFE is so slippery that insects cannot get a grip and tend to fall off. For example, PTFE is used to prevent ants climbing out of formicaria. A particular use of PTFE particles is in anti-drip agents useful as an additive in flame-retardent plactics. For example, DAIKIN-POLYFLON MPA is a white powder made from PTFE resin which has been developed as an additive to prevent dripping when plastics burn.

Preferred Adhesion/Adherence Promoting Material

The preferred adhesion/adherence promoting component is thermoplastic neutralized ethylene-acrylic acid copolymers. The thermoplastic neutralized ethylene-acrylic acid copolymers are made from an ethylene-acrylic acid copolymer which has been neutralized by an amine containing compound such as ammonia, monoethylethanol amine or diethylethanol amine. The acid in the copolymer can be acrylic acid, methacrylic acid, ethacrylic acid, maleic acid, and itaconic acid. These compounds have demonstrated the ability to carry a high pigment load and can be dispersed with a wide variety of materials. The term "thermoplastic" refers to a material which is capable of being repeatedly softened when it is heated and hardened when it is cooled. The term "neutralized" refers to replacing H+ with other cations. The acid units in the present invention include acrylic acid, methacrylic acid, ethacrylic acid, maleic acid, and itaconic acid.

The term "ethylene-acrylic acid copolymers" refers to a polymer containing ethylene units and acid units. The acid units in the present disclosure include acrylic acid, methacrylic acid, ethacrylic acid, maleic acid, and itaconic acid. The thermoplastic neutralized ethylene-acrylic acid copolymer comprises from about 1% to about 99% ethylene-acrylic acid copolymer with a molecular weight of about 1,000 to about 300,000 wherein the acid is selected from the group consisting acrylic acid, methacrylic acid, ethacrylic acid, maleic acid, and itaconic acid; and from about 1% to about 9% of a fugitive or a semifugitive cation selected from a group consisting of: ammonia, monoethylethanol amine, and diethylethanol amine. Most preferred as the neutralized ethylene-acrylic acid copolymer is the family of SEKUR products available from Reedy International Corporation, 25 Front Street, Keyport N.J. Most preferred are SEKUR-CN25, SEKUR OP-950 and SEKUR-CN35.

Preferred Additive

The preferred additive for the present disclosure is one or more colorant. Any of the colorant additives known to those skilled in the art may be used, including those mentioned in the aforementioned patent documents. The colorants may be powder or liquid. Pigments which can be used include, but are not limited to, carbon black (LUCONYL Black), azo pigment (LUCONYL yellow), copper phthalocyanine beta (LUCONYL Blue), iron oxide (LUCONYL red), copper phthalocyanine chlorinated (LUCONYL Green), and titanium dioxide (LUCONYL White). These pigments are available under the LUCONYL trademark from BASF AG, Lugwigshafen, Germany. Also as pigments may be used carbon black (Monarch), Quinacridone red (Sun Chemical) and Umber Iron Oxide (Cathay Pigments). As dyes may be used basic blue dye, Red 55 mixed metal dye (Mitsui) and FD&C Yellow No. 5. Dyes are preferred above pigments in the present disclosure.

Dryer Apparatus

The preferred dryer apparatus of the present disclosure comprises a pulse combustion or spray dryer. Pulse combustion dryers and spray dryers are used to dry a variety of materials. The materials may be introduced into a drying gas stream through one or more introduction devices, which include nozzles tubes, orifices, and other such structures adapted to introduce the materials into the drying gas stream. However, the materials to be dried can be highly viscous. Frequently, the materials to be dried take the form of slurry, paste, or other non-readily flowable form that tends to clog the introduction device. During the drying process, these materials may form clumps, aggregations, agglomerations, and other non-uniformities in the introduction device. Some variations of pulse combustion dryers may fail to adequately break up these clumps as the material is introduced into the drying gas stream. Although typical pulse combustion and spray dryers may be used for some applications with respect to the slurries according to the present disclosure, they may fail to produce a generally uniform dried material in terms of moisture content and/or material size which in many applications of pulse combustion dryers is the desired result.

Therefore, the most preferred dryer apparatus for use with the present disclosure is one according to the disclosure of U.S. Pat. No. 7,988,074. In that disclosure, a material dispersion apparatus is provided which includes a nozzle. The nozzle may define a mixing chamber having a mixing chamber inlet and a mixing chamber outlet, and the mixing chamber may be adapted to receive material through the mixing chamber inlet. The nozzle defines a plenum radially disposed with respect to the mixing chamber, and the plenum has a plenum inlet through which the plenum receives gas. The nozzle defines one or more gas ports in fluid communication with the plenum and in fluid communication with the mixing chamber to flow gas from the plenum into the mixing chamber. The nozzle defines a gap having a gap outlet, and the gap is in fluid communication with the plenum to flow gas from the plenum through the gap and out the gap outlet to cool at least a portion of the nozzle in various aspects. The material dispersion apparatus includes a venturi and the venturi is disposed downstream of the nozzle such that a plume of material ejected from the mixing chamber outlet passes through a venturi throat of the venturi. In use, a drying gas stream is flowed past the nozzle, introducing material into a mixing chamber of the nozzle; swirling the material within the mixing chamber by injecting gas into the mixing chamber; forming a plume in the drying gas stream by ejecting the material from the mixing chamber into the drying gas stream; shaping the plume by positioning a body within the mixing chamber, and passing the plume through a venturi throat of a venturi.

It has been found that using a pulse dryer apparatus such as disclosed in U.S. Pat. No. 7,988,074 minimizes clumping and agglomeration of the colorized coated fillers of the present disclosure, and that the yield and quality of the resulting additive-containing coated fillers is improved over conventional pulse dryer apparatuses.

DESCRIPTION OF THE PREFERRED EMBODIMENTS

The examples which follow are by no means intended to limit the disclosure, but are intended for exemplary purposes only and are not intended to limit the disclosure in any manner whatsoever, but are intended to merely describe those embodiments presently preferred. Percentages in the examples that follow are in weight %. In some of the examples, no water needed to be added to for the slurry/mixture because there was sufficient SEKUR to form the slurry/mixture.

Examples

| Example A | | | |
|---|---|---|---|
| *CaCO$_3$ | 78.00% | | |
| Water | 22.00% | | |
| Example B | | Example C | |
| *CaCO$_3$ | 60.00% | *CaCO$_3$ | 45.00% |
| Sekur CN-35 | 40.00% | Sekur OP-950 | 43.00% |
| | | Water | 12.00% |
| Example D | | Example E | |
| *CaCO$_3$ | 38.00% | *CaCO$_3$ | 45.00% |
| Sekur CN-35 | 26.00% | Sekur CN-25 | 35.00% |
| Water | 36.00% | Sodium Bicarb. | 20.00% |
| Example F | | | |
| *CaCO3 | 45.00% | | |
| Sodium Bicarb. | 20.00% | | |
| Sekur OP-95 | 35.00% | | |
| Example 1 | | Example 2 | |
| *CaCO$_3$ | 41.32% | *CaCO$_3$ | 30.10% |
| Sekur CN-35 | 20.66% | Sekur OP-950 | 34.25% |
| Sekur OP-950 | 20.66% | Sekur CN-35 | 34.25% |

-continued

| | | | |
|---|---|---|---|
| Basic blue dye | 0.83% | Basic blue dye | 1.40% |
| Water | 16.53% | | |
| Example 3 | | Example 4 | |
| *CaCO₃ | 25.20% | *CaCO₃ | 26.00% |
| Sekur CN-35 | 29.90% | Sekur OP-950 | 73.00% |
| Sekur OP-950 | 29.90% | Basic blue dye | 1.00% |
| Basic blue dye | 1.20% | | |
| Water | 13.80% | | |
| Example 5 | | Example 6 | |
| *CaCO₃ | 49.50% | *CaCO₃ | 78.00% |
| Basic blue dye | 0.50% | Red dye 55 | 1.00% |
| REZ | 50.00% | Water | 21.00% |

*Calcium carbonate available from OMYA Corp. under the trademark Omyacarb UFT-FL.

The above compositions were slurried thoroughly and passed through a pulse dryer apparatus available from J. Jireh, referred to above. Example A was performed to show that the drying process using the pulse dryer apparatus available from J. Jireh could provide a fine, non-agglomerated $CaCO_3$ particle powder from the slurry of $CaCO_3$ and $H_2O$. The powder that was produced was a fine non-agglomerated $CaCO_3$ powder. Examples B-F were performed and showed that a plurality of substantially uniformly coated fine, non-agglomerated particles was obtained. The resulting particles of Examples B-F were substantially uniformly coated with the Sekur neutralized ethylene-acrylic acid copolymer. Examples 1-5 produced a plurality of fine, non-agglomerated colored free-flowing particles with the dye adhering well to the filler via the Sekur neutralized ethylene-acrylic acid copolymer. The dye adhered to the Sekur neutralized ethylene-acrylic acid copolymer and thus the filler substantially uniformly. The filler particles thus were substantially uniformly coated with the dye.

The above colored filler particles can be added to polymeric materials and extruded into foam or non-foam articles of manufacture. Typical processing apparatuses and processes may be used to produce such foam or non-foam materials and the processing need not have any particularly special or detailed parameters. The above procedures and materials for adhesion promotion and coloring may likewise be used with any of the fillers described herein, as well as additional filler materials as would be appreciated by those of skill in the art.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All of the above patents and publications and all of the disclosure contained therein are incorporated herein in their entirety as if fully set forth herein.

What is claimed is:

1. A filler composition consisting essentially of:
    a calcium carbonate having a particle size of between 0.4-24 microns;
    an adhesion-promoting material comprised of neutralized ethylene-acrylic acid (EAA) copolymer, wherein the neutralized ethylene-acrylic acid (EAA) copolymer is substantially uniformly coated on the calcium carbonate; and
    an additive comprised of basic blue dye, wherein the additive is substantially uniformly coated on the adhesion-promoting material, and wherein the filler composition is free-flowing and substantially free of agglomerates.

2. The filler composition according to claim 1, wherein the micron-sized calcium carbonate is present in an amount of about 25% to about 50%, wherein the adhesion-promoting material comprised of an aqueous dispersion of neutralized ethylene-acrylic acid (EAA) copolymer is present in an amount of about 40% to about 75%, wherein the additive comprised of basic blue dye is present in an amount of about 0.50% to about 1.50%, wherein about 50% to about 95% of the surface area of the calcium carbonate is coated with the neutralized ethylene-acrylic acid (EAA) copolymer, and wherein the additive is substantially uniformly coated on about 50% to about 95% of the surface area of the adhesion-promoting material.

3. The filler composition according to claim 1, wherein the filter comprises a dried slurry, and wherein the calcium carbonate is present in the slurry before drying in an amount of about 25% to about 50%.

4. The filler composition according to claim 3, wherein the additive is present in an amount of about 0.50% to about 1.50%.

5. A slurry for producing a filler composition consisting essentially of calcium carbonate, an adhesion-promoting material and dye, the slurry comprising:
    a micron-sized calcium carbonate having a particle size of between 0.4-24 microns;
    an adhesion-promoting material comprised of an aqueous dispersion of neutralized ethylene-acrylic acid (EAA) copolymer;
    a basic blue dye as an additive; and
    optionally, additional water to bring the total percent to 100%, wherein, when dried, the filler composition is free-flowing and substantially free of agglomerates, wherein the calcium carbonate is substantially uniformly coated with the adhesion-promoting material, and wherein the additive is substantially uniformly coated on the adhesion-promoting material.

6. The slurry according to claim 5, wherein the calcium carbonate is present in an amount of about 25% to about 50%.

7. The slurry according to claim 5, wherein the adhesion-promoting material is present in an amount of about 40% to about 75%.

8. The slurry according to claim 5, wherein the additive is present in an amount of about 0.50% to about 1.50%.

9. The slurry according to claim 5, wherein the calcium carbonate is present in an amount of about 25% to about 50%, wherein the adhesion-promoting material is present in an amount of about 40% to about 75%, and wherein the additive is present in an amount of about 0.50% to about 1.50%.

10. The slurry according to claim 9, wherein, when dried, about 50% to about 95% of the surface area of the calcium carbonate is coated with the neutralized ethylene-acrylic acid (EAA) copolymer, and wherein the additive is substantially uniformly coated on about 50% to about 95% of the surface area of the adhesion-promoting material.

\* \* \* \* \*